United States Patent [19]

Krefta et al.

[11] Patent Number: 4,950,960
[45] Date of Patent: Aug. 21, 1990

[54] ELECTRONICALLY COMMUTATED MOTOR HAVING AN INCREASED FLAT TOP WIDTH IN ITS BACK EMF WAVEFORM, A ROTATABLE ASSEMBLY THEREFOR, AND METHODS OF THEIR OPERATION

[75] Inventors: Ronald J. Krefta, Fort Wayne; Franklin L. Forbes, LaOtto, both of Ind.

[73] Assignee: General Electric Company, Fort Wayne, Ind.

[21] Appl. No.: 328,674

[22] Filed: Mar. 27, 1989

[51] Int. Cl.[5] .......................................... H02K 37/00
[52] U.S. Cl. ..................... 318/254; 318/138; 310/156
[58] Field of Search ............... 318/254, 138; 310/156

[56] References Cited

U.S. PATENT DOCUMENTS

| | | | |
|---|---|---|---|
| 4,211,963 | 7/1980 | Muller | 318/254 |
| 4,237,397 | 12/1980 | Mohr et al. | 310/156 |
| 4,724,350 | 2/1988 | Shiraki et al. | 310/156 |
| 4,751,416 | 6/1988 | Torok | 310/156 |

FOREIGN PATENT DOCUMENTS 100023008 3/1978 Japan .................................. 310/156

*Primary Examiner*—Bernard Roskoski
*Attorney, Agent, or Firm*—Ralph E. Krisher, Jr.

[57] ABSTRACT

An electronically commutated motor is disclosed including a stationary assembly having a plurality of winding stages adapted for commutation in at least one preselected sequence and a rotatable assembly having a plurality of permanent magnet elements in magnetic coupling relation with the stationary assembly. The permanent magnet elements are adapted to sequentially apply a magnetic field having a substantially constantly increasing magnetic flux to each respective winding stage during the period that current is supplied to the respective winding stage as the rotatable assembly rotates. The permanent magnet elements are also adapted to sequentially apply a magnetic field having a substantially constantly decreasing magnetic flux to each respective winding stage during a period that current is not supplied to the respective winding stage as the rotatable assembly rotates. A rotatable assembly, a method of operating the motor, and a method of rotating the rotatable assembly are also disclosed.

39 Claims, 3 Drawing Sheets

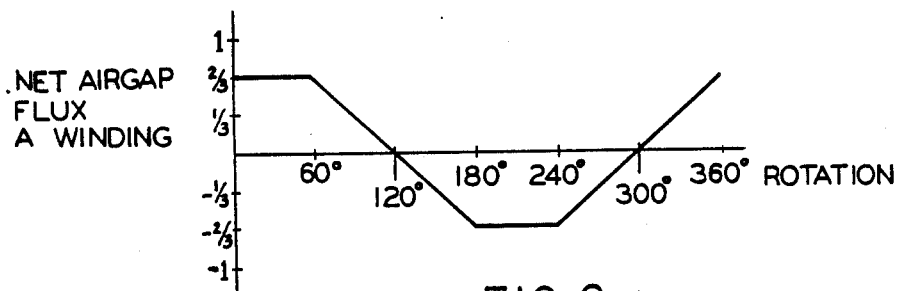
FIG_2(a) PRIOR ART
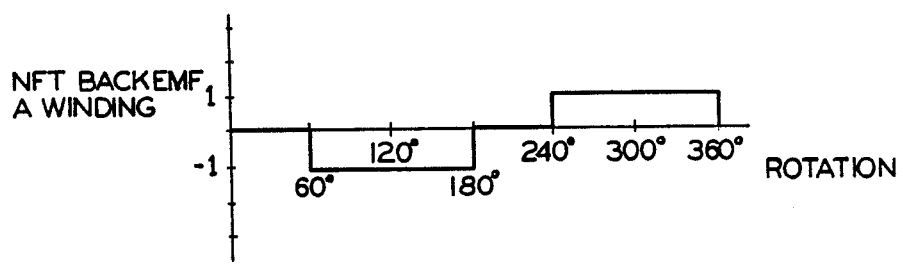
FIG_2(b) PRIOR ART
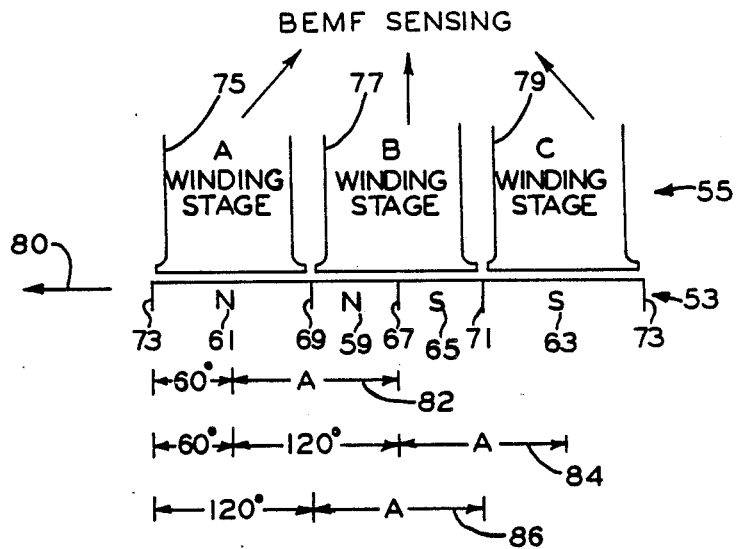
FIG.4

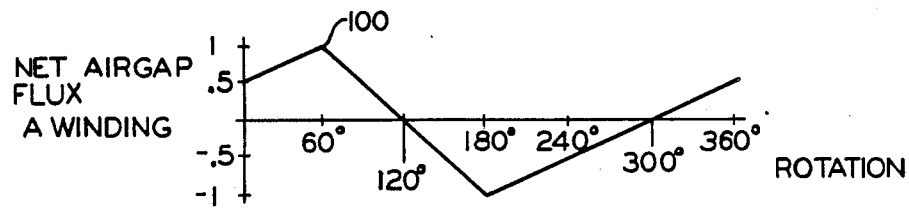
FIG_5(a)
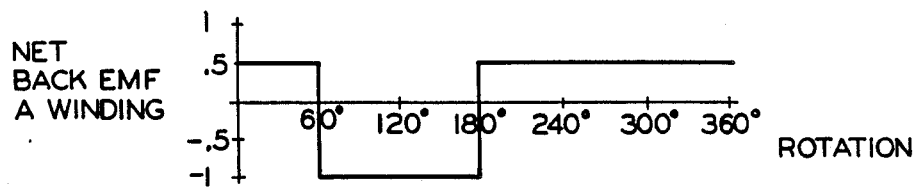
FIG_5(b)
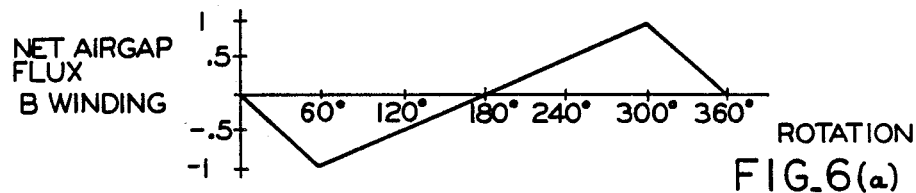
FIG_6(a)
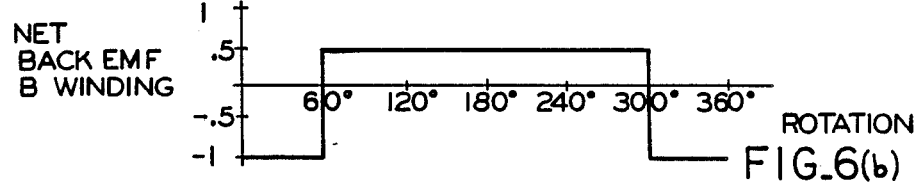
FIG_6(b)
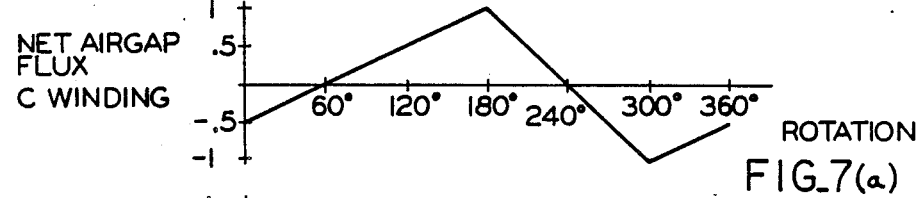
FIG_7(a)
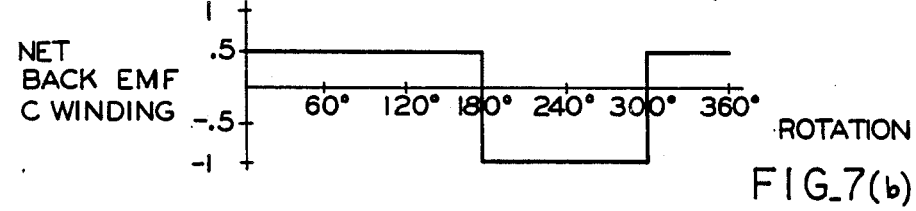
FIG_7(b)

ELECTRONICALLY COMMUTATED MOTOR HAVING AN INCREASED FLAT TOP WIDTH IN ITS BACK EMF WAVEFORM, A ROTATABLE ASSEMBLY THEREFOR, AND METHODS OF THEIR OPERATION

BACKGROUND OF THE INVENTION

This invention relates to dynamoelectric machines and in particular to an electronically commutated motor, a rotatable assembly for an electronically commutated motor, and methods of operating the electronically commutated motor and rotating the rotatable assembly in which the permanent magnet elements thereof provide varying magnetic flux to a stationary assembly as the rotatable assembly rotates.

Various circuit and motor designs have been utilized in the past to develop various types of brushless DC motors, as exemplified in U.S. Pat. No. 4,005,347 issued Jan. 25, 1977, U.S. Pat. No. 4,015,182 issued Mar. 29, 1975, and U.S. Pat. No. 4,449,079 issued May 15, 1984, each of which are incorporated herein by reference. In general, such brushless DC motors have a stator with a plurality of windings therein, a rotor with a plurality of constant magnetic polar regions having constant flux density, and sensors for sensing the relative position of the rotor polar regions with respect to the stator. Signals developed by the position sensors were processed by circuitry for selectively energizing the windings of the motor.

In some of the electronically commutated motors, the circuitry for selectively energizing the windings of the motor includes a pair of driving transistors, such as field effect transistors (FETs), for each winding or a total of six FETs in the circuitry. This circuitry is referred to as a full bridge inverter drive circuit. Since FETs are expensive, other electronically commutated motors have been developed, such as the motor shown in U.S. Pat. No. 4,449,079 mentioned above. In general, such other motors have the circuitry for selectively energizing the windings of the motor which includes only a single driving transistor for each winding or a total of three FETs in the circuitry. This circuitry is referred to as a half bridge inverter drive circuit.

In a three-phase distributed winding motor having a full bridge inverter drive circuit, current can be supplied to each winding by the pair of driving transistors for typically 240 electrical degrees per cycle. However, in a three-phase salient pole motor having a half bridge inverter drive circuit, current can be supplied to each winding by the driving transistors for at most 120 electrical degrees per cycle. This is because the back electromotive force (EMF) waveform of each winding of a three-phase salient pole motor having a half bridge inverter drive circuit has a flat top width of at most 120 electrical degrees (i.e., while the back EMF is positive for 180 electrical degrees) which is the period that current is applied to the winding. Additionally, in a motor having a stator wound with a distributed winding and a half bridge inverter drive circuit, current can be supplied to each winding by the driving transistors for at most 180 electrical degrees per cycle. This is because the back EMF waveform of each winding of a motor having a stator wound with a distributed winding and a half bridge inverter drive circuit has a flat top width of at most 180°. However, it would be desirable in either of the above motors having a half bridge inverter drive circuit to have a back EMF waveform with an increased flat top width, such as 240 electrical degrees, so that torque pulsations can be minimized. This would permit a motor having a half bridge inverter drive circuit, which costs less than a full bridge inverter drive circuit, to operate similarly to a motor having a full bridge inverter drive circuit.

SUMMARY OF THE INVENTION

Among the several objects of the present invention is the provision of an improved electronically commutated motor, an improved rotatable assembly, improved methods of operation of the electronically commutated motor, and improved methods of operating the rotatable assembly which overcome the above discussed disadvantageous or undesirable features, as well as others, of the prior art; the provision of such improved electronically commutated motor and such improved rotatable assembly therefor which achieve minimized torque pulsations, improved energy efficiency and corresponding operating cost savings; the provision of such an improved electronically commutated motor and such an improved rotatable assembly which have drive circuits that are simple in design, economically manufactured and easily assembled; the provision of reduction of torque pulsations in a motor having a half bridge inverter drive circuit; the provision of such a motor having two winding stages energized at the same time; and the provision of such a motor having torque pulsations similar to a motor having a full bridge inverter drive circuit.

In general, in one form of the invention, an electronically commutated motor has a stationary assembly having a plurality of winding stages adapted for commutation in at least one preselected sequence and a rotatable assembly having a plurality of permanent magnet elements in magnetic coupling relation with the stationary assembly. The permanent magnet elements are adapted to sequentially apply a magnetic field having a substantially constantly increasing magnetic flux to each respective winding stage during the period that current is supplied to the respective winding stage as the rotatable assembly rotates. The motor may also include circuitry for sensing the back EMF induced in each of the winding stages by the permanent magnet elements and for commutating the winding stages in response thereto.

In another form of the invention, a rotatable assembly for an electronically commutated motor adapted to be energized from a voltage source. The rotatable assembly has permanent magnet elements in selective magnetic coupling relation with winding stages of a stationary assembly. The rotatable assembly comprises means for sequentially applying a magnetic field having a substantially constantly increasing magnetic flux to each respective winding stage during a period that current is supplied to the respective winding stage as the rotatable assembly rotates. The rotatable assembly includes means for sequentially applying a magnetic field having a substantially constantly decreasing magnetic flux to each respective winding stage during a period that current is not supplied to the respective winding stage as the rotatable assembly rotates.

Further, in general, in another form of the invention a rotatable assembly for an electronically commutated motor adapted to be energized from a voltage source and including a stationary assembly has a plurality of winding stages adapted to be electronically commutated in at least one preselected sequence. The rotatable assembly is in selective magnetic coupling relation with the winding stages. The rotatable assembly comprises a ferromagnetic core having a peripheral portion, a first permanent magnet element and a second permanent magnet element. The first permanent magnet element is arranged on the peripheral portion of the core and has a first arcuate extent of less than 180 electrical degrees along the peripheral portion and has a first flux density. The second permanent magnet element is arranged on the peripheral portion of the core and has a second arcuate extent for substantially the remainder of the peripheral portion and having a second flux density, the first flux density being greater than the second flux density.

In still another form of the invention, an improved electronically commutated motor has a stationary assembly having a plurality of winding stages adapted for commutation in at least one preselected sequence and a rotatable assembly having a plurality of permanent magnet elements in magnetic coupling relation with the stationary assembly. The improvement comprises permanent magnet elements adapted to sequentially apply a magnetic field having a substantially constantly increasing magnetic flux to each respective winding stage during the period that current is supplied to the respective winding stage as the rotatable assembly rotates.

Further, in general, in another form of the invention, a method of operating an electronically commutated motor. A stationary assembly is provided having a plurality of winding stages adapted for commutation in at least one preselected sequence. A rotatable assembly is provided having a plurality of permanent magnet elements in magnetic coupling relation with said stationary assembly. The permanent magnet elements sequentially apply a magnetic field having a substantially constantly increasing magnetic flux to each respective winding stage during the period that current is supplied to the respective winding stage as the rotatable assembly rotates.

Also, in general, in still another form of the invention, a method of rotating a rotatable assembly for an electronically commutated motor adapted to be energized from a voltage source, the rotatable assembly having permanent magnet elements in selective magnetic coupling relation with winding stages of a stationary assembly. A magnetic field having a substantially constantly increasing magnetic flux is sequentially applied to each respective winding stage during a period that current is supplied to the respective winding stage. A magnetic field having a substantially constantly decreasing magnetic flux is sequentially applied to each respective winding stage during a period that current is not supplied to the respective wind-winding stage as the rotatable assembly rotates.

Other objects and features will be in part apparent and in part pointed out hereinafter.

BRIEF DESCRIPTION OF THE DRAWINGS

FIG. 2(a) is a graphical representation of the net airgap flux through a winding stage of the stationary assembly as a function of the position of the rotatable assembly of the prior art motor shown in FIG. 1;

FIG. 2(b) is a graphical representation of the net back EMF induced at a winding stage of the stationary assembly as a function of the position of the rotatable assembly of the prior art motor shown in FIG. 1;

FIG. 4 is a linear diagrammatic representation illustrating positions of magnet elements on the rotatable assembly of the motor of FIG. 3 with respect to the winding stages in the stationary assembly thereof;

FIG. 5(a) is a graphical representation of the net airgap flux through the A Winding Stage of the stationary assembly as a function of the position of the rotatable assembly of the motor of FIG. 3;

FIG. 5(b) is a graphical representation of the net back EMF induced at Winding Stage A of the stationary assembly as a function of the position of the rotatable assembly of the motor of FIG. 3;

FIG. 6(a) is a graphical representation of the net airgap flux through the B Winding Stage of the stationary assembly as a function of the position of the rotatable assembly of the motor of FIG. 3;

FIG. 6(b) is a graphical representation of the net back EMF induced at the B Winding Stage of the stationary assembly as a function of the position of the rotatable assembly of the motor of FIG. 3;

FIG. 7(a) is a graphical representation of the net airgap flux through the C Winding Stage of the stationary assembly as a function of the position of the rotatable assembly of the motor of FIG. 3; and FIG. 7(b) is a graphical representation of the net back EMF induced at the C Winding Stage of the stationary assembly as a function of the position of the rotatable assembly of the motor of FIG. 3.

Corresponding reference characters indicate corresponding parts throughout the several views of the drawings.

DETAILED DESCRIPTION OF THE PREFERRED EMBODIMENTS

Figure 1:
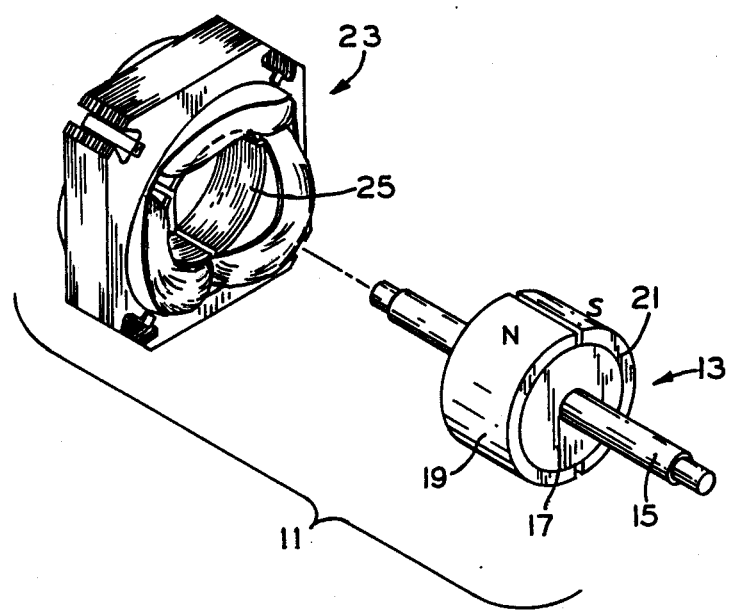
FIG. 1 is an exploded, perspective view of the main elements of a prior art brushless direct current motor.

Referring now to the drawings, and more particularly to FIG. 1, there is illustrated a prior art electronically commutated motor 11 adapted to be energized from a DC power source. The components of the motor 11 include a permanent magnet rotor 13 coaxially mounted on a shaft 15 which in turn is rotatably supported by conventional bearings in a conventional housing, neither of which are illustrated in FIG. 1. The rotor 13 comprises a ferromagnetic steel core 17 and a pair of radially polarized, permanent, arcuate magnets 19 and 21 of equal flux densities, each of which is an arcuate segment on the peripheral portion of the core 17 in a diametrically opposed relationship. The outer peripheral surface of magnet 19 has a north (N) polarization and the outer peripheral surface of magnet 11 has a south (S) polarization. Although a pair of magnets are illustrated, other prior art motors have included a plurality of pairs of magnets positioned on the peripheral portion of the core. Magnets 19 and 21 each span 180 mechanical degrees.

Stationary assembly or stator 23 includes a plurality of winding stages 25 (e.g. three) adapted to be electronically commutated in at least one preselected sequence. Each of the winding stages 25 span 120 mechanical degrees. Additionally, other motors have been constructed having more than three winding stages.

When the winding stages 25 are energized in a temporal sequence, magnetic poles are established that provide a radial magnetic field which moves clockwise or counterclockwise around the stator 23 depending on the preselected sequence or order in which the stages 25 are energized. This moving field is linked with the flux field of the permanent magnets 19 and 21 of rotor 13 to cause rotation of rotor 13 relative to stator 23 in the desired direction. As a result, a torque is developed which is a direct function of the intensities or strengths of the magnetic fields. For a more detailed description of the construction of motor 11, reference may be had to U.S. Pat. No. 4,528,485, incorporated herein by reference.

The winding stages 25 of motor 11 may be commutated without brushes by sensing the rotational position of rotor 13 as it rotates within stator 23. The electrical signals generated as a function of the rotational position of the rotor 13 are utilized sequentially apply a DC voltage to each of the winding stages 25 in different preselected orders or sequences that determine the direction of the rotation of the rotor 13. Position sensing may be accomplished by a position-detecting circuit responsive to the back EMF of the motor 11 (or responsive to a Hall sensor or other position detecting sensor) to provide a signal indicative of the rotational position of rotor 13 to control the timed sequential application of voltage to the winding stages 25 of the motor 11.

Referring now to FIG. 2(a), a graphical representation of the net airgap flux linking one of the winding stages 25 as a function of the position of the rotor 13 for prior art motor 11 is illustrated. The net airgap flux linking one of the winding stages 25 is graphed along the y-axis and degrees of rotation of the rotor 13 are graphed along the x-axis. The net airgap flux is measured in units of webers. However, for purposes of example, the units graphed along the y-axis have been normalized to represent ratios of the flux which links one of the winding stages 25 to the total flux. The waveform of FIG. 2(a) of the net airgap flux is initially at its maximum value of ⅔ units of the total flux as the rotor 13 turns through its first 60° of rotation. The net airgap flux then decreases from its maximum value of ⅔ units of the total flux at a constant rate for the next 120° of rotation of the rotor 13 crossing zero at 120° and reaching its minimum value of −⅔ units of the total flux at 180°. This decrease in the net airgap flux is due to magnet 19 moving away from the winding stage 25 and magnet 21 replacing magnet 19 and providing an opposite flux to the winding stage 25. Next, it is at the minimum value of −⅔ units of the total flux for 60° and it then increases at a constant rate until it again reaches its maximum value of ⅔ units of the total flux at 360°.

FIG. 2 (b) illustrates a graph of the waveform of the net back EMF induced in the above winding stage 25 as a function of the position of the rotor 13 for motor 11. In general, the net back EMF is proportional to the derivative of the net airgap flux with respect to time. The back EMF is graphed along the y-axis and degrees of rotation of the rotor 13 are graphed along the x-axis. The back EMF is measured in volts. For purposes of example only, the units graphed along the y-axis have been normalized to represent ratios of the back EMF induced in winding stage 25 to the maximum back EMF. For the initial 60° period beginning at 0° rotation when the rotor 13 begins to rotate, the back EMF has a value of zero units of the maximum back EMF because the net airgap flux is at a constant maximum. The back EMF is at its minimum value of −1 unit of the maximum back EMF for the next 120° between 60° and 180° of rotation because the net airgap flux is decreasing at a constant rate. Next, it again has a value of zero units of the maximum back EMF for a period of 60° between 180° and 240° of rotation because the net airgap flux is at a constant minimum. Finally, the back EMF is at its maximum value of 1 unit of the total maximum EMF for a period of 120° between 240° and 360° of rotation because the net airgap flux is increasing at a constant rate. The period in which the back EMF is at its constant maximum value is referred to as the back EMF flat top. As shown in FIG. 2(b), this flat top occurs between 240° and 360° for winding stage A. The back EMF flat top width in degrees is limited to the ratio of the angular extent of a winding stage to the angular extent of a magnet multiplied by 180 degrees. Using motor 11 as an example, the angular extent of a winding stage is 120° and the angular extent of a magnet is 180°. The maximum extent of the back EMF flat top is 120°, i.e., (120°/180°)×180°=120°.

In one preferred embodiment of the invention, a motor having a half bridge inverter drive circuit (wherein the maximum extent of the back EMF flat top would normally be 120°) operates simularly to a motor having a full bridge inverter drive circuit (wherein the maximum extent of the back EMF flat top is 240°). As a result, the maximum extent of the back EMF flat top of the motor is increased and torque pulsations are reduced. This is because the increased flat top width permits one phase to be energized while the other two phases are being commutated, i.e., one phase being turned on while the other phase is being turned off. In one preferred embodiment of the invention, this is accomplished by a rotor having a plurality of magnetic elements of different magnetic flux densities.

Figure 3:
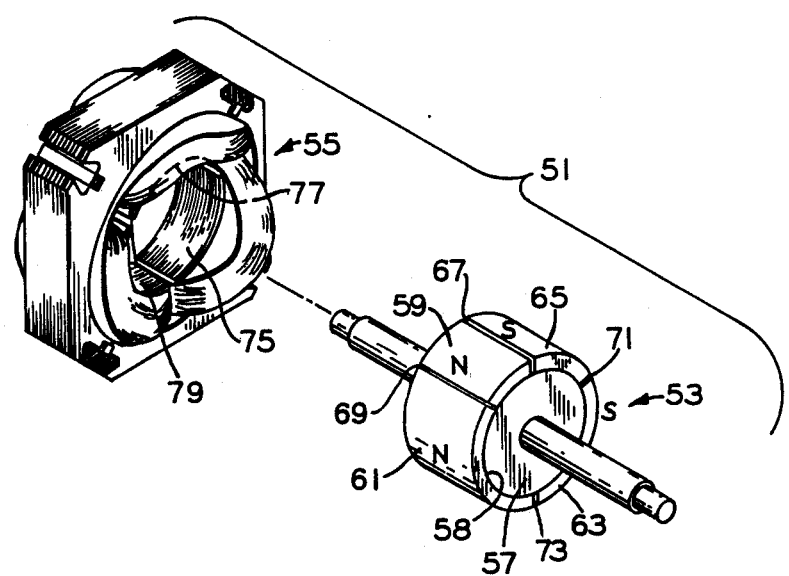
FIG. 3 is an exploded, perspective view of the main elements of a brushless DC motor in one form of the invention.

One preferred embodiment of the invention is illustrated in FIG. 3. Motor 51 is adapted to be energized from a DC power source and includes a rotatable assembly or rotor 53 and a stationary assembly 55. Rotor 53 comprises a ferromagnetic core 57 having a peripheral portion 58 and four arcuate, permanent magnet elements 59, 61, 63, and 65 arranged end to end on the peripheral portion 58 of core 57 with each of the magnet elements having an arcuate extent along the peripheral portion 58.

Each of the magnets 59, 61, 63, and 65 provides a magnetic field having a magnetic flux (measured in webers) and is in magnetic coupling relation with the stationary assembly 55. Magnet 61 is on the peripheral portion 58 having its arcuate extent less than 180 electrical degrees. The arcuate extent of magnet 65, also on peripheral portion 58, is greater than the arcuate extent of magnet 61. Magnet 59 is arranged on the peripheral portion 58 between opposing edges 67 and 69 of magnets 61 and 65, respectively. Also, magnet 63 is arranged on the peripheral portion 58 between the other opposing edges 71 and 73 of magnets 61 and 65, respectively.

Each of the magnet elements is radially polarized so that its outer peripheral surface has a polarity different from the polarity of its inner peripheral surface. As indicated in FIG. 3, magnet elements 59 and 61 have outer surfaces having a north (N) polarization and magnet elements 63 and 65 have outer surfaces having a south (S) polarization. Magnet 59 has a flux density (measured in webers per square meter or tesla) which is at least three times the flux density of magnet 61. Also, magnet 65 has a flux density which is at least three times the flux density of magnet 63.

Stationary assembly 55 includes a plurality (e.g., three) of winding stages, i.e., the A winding stage is referred to by reference character 75, the B winding stage is referred to by reference character 77, and the C winding stage is referred to by reference character 79. The winding stages are adapted to be electronically commutated in at least one preselected sequence. When the winding stages 75, 77, and 79 are energized in a temporal sequence, radial magnetic fields are established which move clockwise or counterclockwise around the stationary assembly 55 depending on the preselected sequence or order in which the winding stages 75, 77, and 79 are energized. This moving field intersects with the flux field of the permanent magnet rotor 53 to cause rotation of rotor 53 relative to stationary assembly 55 in the desired direction to develop a torque which is a direct function of the intensities or strengths of the magnetic fields.

The winding stages 75, 77, and 79 of motor 51 may be commutated without brushes by sensing the rotational position of the rotor 53 as it rotates within stator 55. The electrical signals generated as a function of the rotational position of the rotor 53 are utilized to sequentially apply a DC voltage to each of the winding stages 75, 77, and 79 in different preselected orders or sequences that determine the direction of the rotation of the rotor 53. A half bridge inverter drive circuit, such as disclosed in U.S. Pat. No. 4,449,079, may be used to apply a voltage to one or more of the winding stages at a time. Position sensing may be accomplished by a position-detecting circuit responsive to the back EMF of the motor 51. Such a circuit provides a signal indicative of the rotational position of the rotor 53 to control the timed sequential application of voltage to the winding stages 75, 77, and 79 of the motor 51. Other circuits or devices for sensing the position of the rotor 53 may be utilized, such as Hall devices or pulsing light through a disc to establish pulses which turn the windings on and off.

FIG. 4 illustrates a linear diagrammatic representation of the relationship between rotor 53 and the stationary assembly 55 of the motor 51. FIG. 4 shows the positions of the magnet elements 59, 61, 63, and 65 relative to the winding stages 75, 77, and 79. Each one of the winding stages spans 120 mechanical degrees or 120 electrical degrees. For this motor mechanical degrees and electrical degrees are equal in magnitude because the motor includes two poles, i.e., (electrical degrees)=(mechanical degrees)×(number of poles/2). Magnet elements 61 and 63 each have an arcuate extent of 120 mechanical degrees and magnet elements 59 and 65 each have an arcuate extent of 60 mechanical degrees. For purposes of example, it is assumed that the direction of rotation of the rotatable assembly 53 is to the left as indicated by arrow 80 or in the counterclockwise direction.

FIG. 5(a) is a graphical representation of the net airgap flux linking the A winding stage 75 as the rotor 53 rotates one revolution. One revolution of the rotor 53 is equal to 360 mechanical degrees or 360 electrical degrees. Again, for this motor mechanical degrees and electrical degrees are equal because the motor includes two poles. Also, for purposes of example, the units graphed along the y-axis have been normalized to represent ratios of the flux which links the A winding stage 75 to the total flux. Initially, the rotor 53 is positioned as illustrated in FIG. 4. Assuming element 61 has a flux density of ½ unit, then element 59 has a flux density of 1.5 units, i.e., three times the flux density of element 61. However, element 59 has half the arcuate extent of element 61. Therefore, the total flux which links element 61 to the winding stages is ½ unit and the total flux which links element 59 to all winding stages is ¾ unit. Initially, only element 61 is opposite the A winding stage 75 so that the total air gap flux linking winding stage 75 is ½ unit as contributed by element 61.

As the winding stages are commutated, rotor 53 rotates the magnet elements 61 and 59 to provide a relatively constantly increasing magnetic flux to winding stage 75. This increase is due to element 59 having a greater flux density than element 61 and element 59 moving into position adjacent the A winding stage 75 replacing element 61. When the rotor 53 has rotated 60°, the net airgap flux linking winding stage 75 reaches its peak value of 1 unit of total flux. Referring to FIG. 4, rotation of the rotor 53 for 60° results in half of magnet element 61 and all of magnet element 59 in position adjacent A winding stage 75 as indicated by reference character 82. The contribution of half of the flux from magnet element 61 is added to the contribution of all of the flux from magnet element 59 to equal 1 unit of total flux, which is the maximum flux value 100 for the A winding as shown in FIG. 5(a). When the rotor 53 has rotated a total of 120°, as indicated by reference character 86, all of magnet element 59 and all of magnet element 65 are in position adjacent the A winding stage 75.

As the rotor 53 continues to rotate in the direction of arrow 80 from its 60° position 82, the net airgap flux decreases at a constant rate for an additional period of 120° until it reaches its minimum value of −1 unit of the total flux at 180°. This decrease is due to all magnet element 65 and half of element 63 being positioned adjacent to the A winding stage 75 as indicated by reference character 84. The net airgap flux is zero units of the total flux due to the contribution from magnet element 65 canceling the contribution of magnet element 59. Thereafter, the net airgap flux increases at a constant rate for the next 180° of rotation of the rotor 53 until it reaches a value of 1 unit of the total flux at 360°.

FIG. 5(b) is a graphical representation of the net back EMF induced at the A winding stage 75 of the stationary assembly 55 as a function of the position of the rotor 53. The units graphed along the y-axis have been normalized to represent ratios of the back EMF induced in the A winding stage 75 to the maximum back EMF. The back EMF is at its maximum value for the first 60° of rotation of the rotor 53 because the net airgap flux is increasing at a constant rate. As the rotor 53 continues to rotate from 60° to 120°, the maximum EMF drops to its minimum value of −1 unit of the total back EMF because the net airgap flux is decreasing at a constant rate. Finally, the back EMF returns to its maximum positive value of 0.5 unit of the maximum back EMF for the remainder of the rotation of the rotor 53 from 180° to 360° because the net airgap flux is increasing at a constant rate.

In general, the minimum value of the back EMF of motor 51 as illustrated in FIG. 5(b) is greater in magnitude than the minimum value of the back EMF of motor 11 as illustrated in FIG. 2(b). Therefore, a winding stage of certain embodiments of motor 51 may be subject to shorting out through drive circuitry (e.g., by forward biasing a diode) if its back EMF reaches a high enough negative level. The resultant current flow from shorting will produce a negative torque. Hence, it may be desirable to include a diode to prevent such a negative current.

Referring to FIG. 5(b) again, the back EMF flat top has a duration of 240° which corresponds to 360° less the angular extent of a winding stage. In comparison, the back EMF flat top as shown in FIG. 2(b) has a duration of only 120°. In general, the back EMF flat top of a motor can be extended by employing some magnet elements such as elements 59 and 65, each having a flux density which is greater than the flux densities of other magnet elements, such as elements 61 and 63. Preferably, the angular extent of each of the magnet elements 59 and 65 is 60° which corresponds to the difference between a pole length, which is 180°, and the length of a winding stage, which is 120°.

As shown in FIG. 5(a), the net airgap flux of the A winding stage 75 is increasing at a constant rate during the period that current is being supplied to the A winding stage 75, i.e., during the period that the back EMF induced in the A winding stage 75 is positive. Additionally, the net airgap flux of the A winding stage 75 is decreasing at a constant rate during the period that current is not supplied to the A winding stage 75, i.e., during the period that the back EMF induced in the A winding stage 75 is negative. Thus, the change in the net airgap flux of the A winding stage 75 is proportional to a change in position of the rotor 53. Magnets 59, 61, 63, and 65 constitute means for sequentially applying a magnetic field having a substantially constantly increasing magnetic flux to a winding stage during a period that current is supplied to a winding stage. Magnets 59, 61, 63, and 65 also are an example of means for sequentially applying a magnetic field having a substantially constantly decreasing magnetic flux to a winding stage during a period that current is not supplied to a winding stage.

Referring to FIG. 6(a), a graph of the net airgap flux through the B winding stage 77 as a function of the position of the rotor 53 is illustrated. This waveform is essentially the same shape as the waveform illustrated in FIG. 5(a) shifted to the left by 120°. FIG. 6(b) shows a graph of the net back EMF induced at the B winding stage 77 as a function of the position of rotor 53. This waveform is essentially the same shape as the waveform shown in FIG. 5 (b) shifted to the left by 120°. Additionally, the waveforms illustrated in FIGS. 7(a) and 7(b) are essentially the same as the waveforms of FIGS. 5(a) and 5(b), respectively, shifted to the left by 240°.

Further, while the electronically commutated motor is illustrated herein as a three-phase half bridge inverter drive configuration for purposes of disclosure, it is contemplated that other motors of different constructions may be utilized in one or another form of the invention so as to meet at least some of the objects thereof. For example, the motor may be single-phase, four-phase, or six-phase.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An electronically commutated motor comprising:
   a stationary assembly having a plurality of winding stages adapted for commutation in at least one preselected sequence; and
   a rotatable assembly having means, including a plurality of permanent magnet elements in magnetic coupling relation with said stationary assembly, for sequentially applying a magnetic field having a substantially constantly increasing magnetic flux to each respective winding stage during the period that current is supplied to the respective winding stage as said rotatable assembly rotates, and for sequentially applying a magnetic field having a substantially constantly decreasing magnetic flux to each respective winding stage during a period that current is not supplied to the respective winding stage as said rotatable assembly rotates.

2. The motor of claim 1 further comprising means for sensing the back EMF induced in each of the winding stages by the permanent magnet elements during the period that current is not supplied to a respective winding stage and for commutating the winding stages in response thereto.

3. The motor of claim 1 further comprising means for applying a motor voltage to one or more of the winding stages at a time, said means for applying including a half bridge inverter drive circuit.

4. The motor of claim 1 wherein the rotatable assembly further comprises:
   a ferromagnetic core having a peripheral portion;
   a first one of the permanent magnet elements arranged on the peripheral portion of said core and having a first arcuate extent of less than 180 electrical degrees along the peripheral portion and having a first flux density; and
   a second one of the permanent magnet elements arranged on the peripheral portion of said core and having a second arcuate extent greater than the first arcuate extent and having a second flux density, the first flux density being greater than the second flux density.

5. The motor of claim 4 wherein the first flux density has a magnitude which is greater than substantially three times the second flux density.

6. The motor of claim 4 wherein the second arcuate extent is for substantially the remainder of the peripheral portion not covered by the first element.

7. The motor of claim 6 wherein the second arcuate extent is substantially two times greater than the first arcuate extent.

8. The motor of claim 4 wherein the first permanent magnet element has an outer peripheral surface having a first polarity and the second permanent magnet element has an outer peripheral surface having a second polarity, the first polarity being opposite that of the second polarity.

9. The motor of claim 8 wherein the rotatable assembly further comprises:
   a third one of the permanent magnet elements arranged on the peripheral portion of said core between one set of opposing edges of the first and the second elements and having a third arcuate extent along the peripheral portion and having a third flux density, the third flux density being greater than the second flux density, the third element having an outer peripheral surface having the second polarity; and
   a fourth one of the permanent magnet elements arranged on the peripheral portion of said core between the other set of opposing edges of the first and the second elements and having a fourth arcuate extent along the peripheral portion and having a fourth flux density, the first flux density being greater than the fourth flux density, the fourth element having an outer peripheral surface having the first polarity.

10. The motor of claim 9 wherein the third flux density is substantially three times greater than the second flux density and the first flux density is substantially three times greater than the fourth flux density.

11. The motor of claim 9 wherein the second arcuate extent is greater than the third arcuate extent and the fourth arcuate extent is greater than the first arcuate extent.

12. The motor of claim 11 wherein the second arcuate extent is substantially two times greater than the third arcuate extent and the fourth arcuate extent is substantially two times greater than the first arcuate extent.

13. The motor of claim 9 wherein the first flux density is substantially equal to the third flux density and the second flux density is substantially equal to the fourth flux density, and the first arcuate extent is substantially equal to the third arcuate extent and the second arcuate extent is substantially equal to the fourth arcuate extent.

14. A rotatable assembly for an electronically commutated motor adapted to be energized from a voltage source, the rotatable assembly in selective magnetic coupling relation with winding stages of a stationary assembly, the rotatable assembly comprising:
   means, including a plurality of radially polarized permanent magnet elements, for sequentially applying a magnetic field having a substantially constantly increasing magnetic flux to each respective winding stage during a period that current is supplied to the respective winding stage as said rotatable assembly rotates, and for sequentially applying a magnetic field having a substantially constantly decreasing magnetic flux to each respective winding stage during a period that current is not supplied to the respective winding stage as said rotatable assembly rotates; and
   means for supporting said elements in magnetic coupling relation with said stationary assembly.

15. The rotatable assembly of claim 14 further comprising:
   a ferromagnetic core having a peripheral portion;
   a first one of the permanent magnet elements arranged on the peripheral portion of said core and having a first arcuate extent of less than 180 electrical degrees along the peripheral portion and having a first flux density; and
   a second one of the permanent magnet elements arranged on the peripheral portion of said core and having a second arcuate extent for substantially the remainder of the peripheral portion and having a second flux density, the first flux density being greater than the second flux density.

16. The rotatable assembly of claim 15 wherein the first flux density is substantially three times greater than the second flux density.

17. The rotatable assembly of claim 15 wherein the second arcuate extent is greater than the first arcuate extent.

18. the rotatable assembly of claim 17 wherein the second arcuate extent is substantially two times greater than the first arcuate extent.

19. The rotatable assembly of claim 15 wherein the first permanent magnet element has no outer peripheral surface having a first polarity and the second permanent magnet element has an outer peripheral surface having a second polarity, the first polarity being opposite that of the second polarity.

20. The rotatable assembly of claim 19 further comprising:
   a third one of the permanent magnet elements arranged on the peripheral portion of said core between one set of opposing edges of the first and the second elements and having a third arcuate extent along the peripheral portion and having a third flux density, the third flux density being greater than the second flux density, the third element having an outer peripheral surface having the second polarity; and
   a fourth one of the permanent magnet elements arranged on the peripheral portion of said core between the other set of opposing edges of the first and the second elements and having a fourth arcuate extent along the peripheral portion and having a fourth flux density, the first flux density being greater than the fourth flux density, the fourth element having an outer peripheral surface having the first polarity.

21. The rotatable assembly of claim 20 wherein the third flux density is substantially three times greater than the second flux density and first flux density is substantially three times greater than the fourth flux density.

22. The rotatable assembly of claim 21 wherein the second arcuate extent is greater than the third arcuate extent and the fourth arcuate extent is greater than the first arcuate extent.

23. The rotatable assembly of claim 22 wherein the second arcuate extent is substantially two times greater than the third arcuate extent and the fourth arcuate extent is substantially two times greater than the first arcuate extent.

24. The rotatable assembly of claim 20 wherein the first flux density is substantially equal to the third flux density and the second flux density is substantially equal to the fourth flux density, and the first arcuate extent is substantially equal to the third arcuate extent and the second arcuate extent is substantially equal to the fourth arcuate extent.

25. The rotatable assembly of claim 14 wherein the motor further comprises means for applying a motor voltage to one or more of the winding stages at a time, said means for applying including a half bridge inverter drive circuit.

26. A rotatable assembly for an electronically commutated motor adapted to be energized from a voltage source and including a stationary assembly having a plurality of winding stages adapted to be electronically commutated in at least one preselected sequence, the rotatable assembly in selective magnetic coupling relation with the winding stages, the rotatable assembly comprising:
   a ferromagnetic core having a peripheral portion;
   a first permanent magnet element arranged on the peripheral portion of said core and having a first arcuate extent of less than 180 electrical degrees along the peripheral portion and having a first flux density, said first permanent magnet element having an outer peripheral surface having a north polarity; and
   a second permanent magnet element arranged on the peripheral portion of said core and having a second arcuate extent greater than the first arcuate length and having a second flux density, the first flux density being greater than the second flux density, said second permanent magnet element having an outer peripheral surface having a south polarity;

a third permanent magnet element arranged on the peripheral portion of said core between one set of opposing edges of the first and the second elements and having a third arcuate extent less than the second arcuate extent and having a third flux density, the third flux density being greater than the second flux density, the third element having an outer peripheral surface having the south polarity; and a fourth permanent magnet element arranged on the peripheral portion of said core between the set of opposing edges of the first and the second elements and having a fourth arcuate extent greater than the first arcuate extent and having a fourth flux density, the first flux density being greater than the fourth flux density, the fourth element having an outer peripheral surface having the north polarity.

27. The rotatable assembly of claim 26 wherein the first flux density is substantially three times greater than the second flux density, the first and third flux densities being substantially equal and the second and fourth flux densities being substantially equal.

28. The rotatable assembly of claim 26 wherein the second arcuate extent is greater than the first arcuate extent, the first and third arcuate extents being substantially equal and the second and fourth arcuate extents being substantially equal.

29. The rotatable assembly of claim 28 wherein the second arcuate extent is substantially two times greater than the first arcute extent.

30. The rotatable assembly of claim 26 wherein the motor further comprises means for applying a motor voltage to one or more of the winding stages at a time, said means for applying including a half bridge inverter drive circuit.

31. In an electronically commutated motor comprising a stationary assembly having a plurality of winding stages adapted for commutation in substantially one preselected sequence, a rotatable assembly having a plurality of permanent magnet elements in magnet coupling relation with said stationary assembly, the improvement comprising; means, including said permanent magnet elements for sequentially applying a magnetic field having a substantially constantly increasing magnetic flux to each respective winding stage during the period that current is supplied to the respective winding stage as said rotatable assembly rotates, and for sequentially applying a magnetic field having a substantially constantly decreasing magnetic flux to each respective winding stage during a period that current is not supplied to the respective winding stage as said rotatable assembly rotates.

32. The motor of claim 31 wherein the rotatable assembly further comprises:

a ferromagnetic core having a peripheral portion;

a first permanent magnet element arranged on the peripheral portion of said core and having a first arcuate extent of less than 180 electrical degrees along the peripheral portion and having a first flux density, said first permanent magnet element having an outer peripheral surface having a north polarity;

a second permanent magnet element arranged on the peripheral portion of said core and having a second arcuate extent greater than the first arcuate length and having a second flux density, the first flux density being greater than the second flux density, said second permanent magnet element having an outer peripheral surface having a south polarity;

a third permanent magnet element arranged on the peripheral portion of said core between one set of opposing edges of the first and the second elements and having a third arcuate extent less than the second arcuate extent and having a third flux density, the third flux density being greater than the second flux density, the third element having an outer peripheral surface having the south polarity; and a fourth permanent magnet element arranged on the peripheral portion of said core between the other set of opposing edges of the first and the second elements and having a fourth arcuate extent greater than the first arcuate extent and having a fourth flux density, the first flux density being greater than the fourth flux density, the fourth element having an outer peripheral surface having the north polarity.

33. The motor of claim 32 wherein the first flux density is substantially three times greater than the second flux density, the first and third flux densities being substantially equal and the second and fourth flux densities being substantially equal.

34. The motor of claim 32 wherein the second arcuate extent is greater than the first arcuate extent, the first and third arcuate extents being substantially equal and the second and fourth arcuate lengths being substantially equal.

35. The motor if claim 34 wherein the second arcuate extent is substantially two times greater than the first arcuate extent.

36. The motor of claim 31 further comprising means for applying a voltage to one or more of the winding stages at a time, said means for applying including a half bridge inverter drive circuit.

37. A method of operating electronically commutated motor comprising the steps of:

providing a stationary assembly having a plurality of winding stages adapted for commutation in substantially one preselected sequence; and providing a rotatable assembly having a plurality of permanent magnet elements in magnetic coupling relation with said stationary assembly;

sequentially applying magnetic field having a substantially constantly increasing magnetic flux to each respective winding stage during the period that current is supplied to the respective winding stage as said rotatable assembly rotates; and sequentially applying a magnetic field having a substantially constantly decreasing magnetic flux to each respective winding stage during a period that current is not supplied to the respective winding stage as said rotatable assembly rotates.

38. The method of claim 37 further comprising the step of sensing the back EMF induced in each of the winding stages by the permanent magnet elements and for commutating the winding stages in response thereto.

39. A method of rotating a rotatable assembly for an electronically commutated motor adapted to be energized from a voltage source, the rotatable assembly having permanent magnet elements in selective magnetic coupling relation with winding stages of a stationary assembly, the method comprising the steps of:

sequentially applying a magnetic field having a substantially constantly increasing magnetic flux to each respective winding stage during a period that current is supplied to the respective winding stage as said rotatable assembly rotates; and sequentially applying a magnetic field having a substantially constantly decreasing magnetic flux to each respective winding stage during a period that current is not supplied to the respective winding stage as said rotatable assembly rotates.

* * * * *